May 6, 1924.
A. J. TRUMBO
HAND PRESS
Filed Aug. 23, 1920
1,492,908
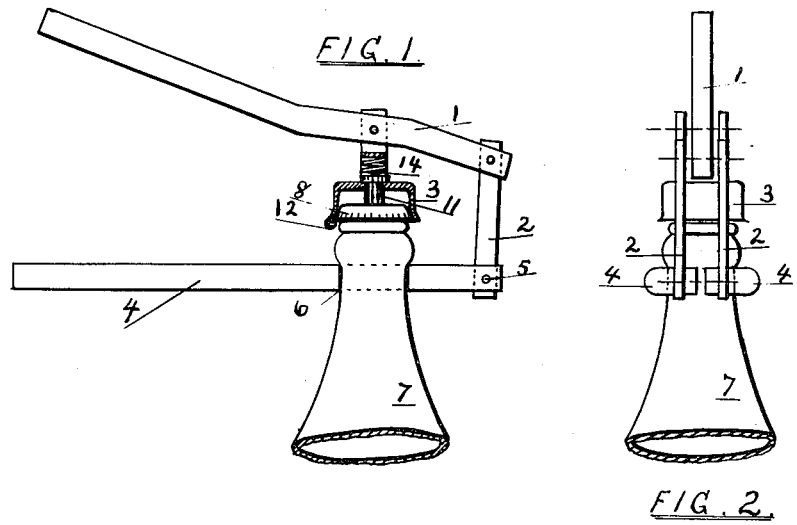
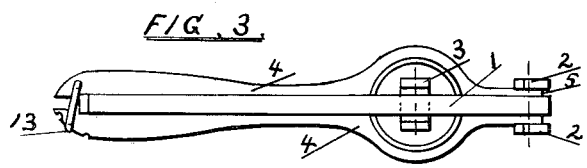
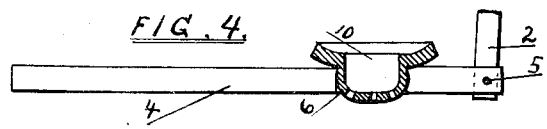
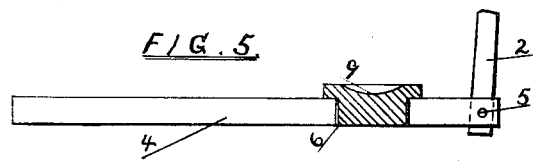
Inventor
Andrew J. Trumbo
By
William W. Varney
Attorney Patented May 6, 1924.

1,492,908

UNITED STATES PATENT OFFICE.

ANDREW J. TRUMBO, OF BALTIMORE, MARYLAND.

HAND PRESS.

Application filed August 28, 1920. Serial No. 406,626.

*To all whom it may concern:*

Be it known that I, ANDREW J. TRUMBO, a citizen of the United States, and a resident of Baltimore city, in the State of Maryland, have invented a certain new and useful Hand Press, of which the following is a specification.

My invention relates to improvements in hand presses and has for its object a capping and de-capping of bottles and holding the cap in place during such operation.

A further object of my improvement is the providing in a hand press, improved means of holding an article against which pressure is exerted.

A further object of my improvement is the providing in a hand press, magnetic means of holding an article operated upon.

A further object of my improvement is the providing in a hand press improved means of clamping an interchangeable part against which an article is pressed.

A further object of my improvement is the providing a combination tool for capping and de-capping bottles of various sizes, cracking nuts, squeezing lemons or other similar purposes.

A further object of my improvement is the providing of improved means of de-capping a bottle and holding the cap after its removal.

With the foregoing and other objects in view, my invention consists of the novel construction, combination and arrangements of parts as hereinafter specifically described and illustrated in the accompanying drawing, wherein is shown the preferred embodiment of my invention, but it is understood that changes, variations and modifications can be resorted to which come within the scope of the claims hereunto appended.

In the drawing of the herein described embodiment of my invention; Figure 1, is a view in elevation of my improved hand press as used in pressing a cap on to a bottle, one link 2 and one part of the gripping tong 4 being omitted, the cap being shown in position over a bottle ready for capping. Fig. 2, is a view in elevation taken at right angles to that shown in Fig. 1. Fig. 3, is a plan view of the device shown in Fig. 1. Fig. 4, shows the gripping tongs 4 holding an anvil 10 suitable for pressing citrus fruits and Fig. 5, is a view of the gripping tongs 4 holding an anvil 9 suitable for cracking nuts.

Similar numerals refer to similar parts throughout the several views.

1 is the lever which is loosely fulcrumed between links 2 by means of a pin or bolt not shown. Presser 3 is pivoted to lever 1 by pin or bolt not shown.

4 are the gripping tongs which are loosely fulcrumed or hinged at 5 to links 2 by a pin or bolt not shown. This loose fitting permits of considerable play of tongs 4 sufficient for adjustment in gripping and also for placing on or removal from articles to be clamped.

Gripping tongs 4 are formed at 6 to fit an article to be pressed against, such as a bottle or an anvil. 7 is a bottle upon which cap 8 is to be pressed and crimped by means of presser 3 as shown in Fig. 1. 9 is an anvil which may be held by gripping tongs 4 as shown in Fig. 5 and against which a nut may be pressed or cracked by presser 3. 10 is a modified form of the anvil of depressed shape and provided with holes and against which a citrus fruit (lemon or lime) may be pressed and the juice extracted.

11 is a permanent magnet operating in presser 3 to attract or hold any metallic body, such as a bottle cap within said presser while being operated upon. Magnet 11 is pushed against the article to be held by spring 14, said spring being inserted between a cross arm of presser 3 and said magnet.

On presser 3 is catch 12, this catch is formed on one side of the bottom edge of the presser and is to catch under cap 8 for de-capping or opening a bottle. 13 is a locking device or catch on gripping tongs 4 for holding the same together in a variable degree over a series of notches while the tongs are gripping a body to be held.

The operation of my invention is as follows—

As it is perfectly obvious as to how my hand press is used in the cracking of nuts or squeezing of citrus fruits, I will only describe more specifically the more intricate operation of capping or uncapping a bottle.

The bottle 7 to be capped is gripped by gripping tongs 4 which will fit bottles of various size necks and are secured together by locking device 13.

Cap 8 which is usually of magnetic substance such as socalled tin (iron or steel plated) is placed within presser 3 and held there by magnet 11. The presser is placed over the mouth of the bottle and pressed down on the same by means of lever 1, the presser crimping the cap and securing the same. By pressing lever 1 back and at the same time lifting it, catch 12 is thrown out of engagement with the cap and the presser is freely removed.

In removing the cap from a bottle, which is gripped as above described by gripping tongs 4, the presser is placed over the cap and lever 1 pulled forward at the same time lifted, whereby catch 12 catches under the cap, pulling the same off. The cap being held in the presser by magnet 11.

Having thus described my invention, what I claim and desire to secure by Letters Patent is—

1. A bottle capping and de-capping appliance comprising a bottle gripping means, a presser carried thereby for capping a bottle, a catch on said presser for engaging a cap to remove the same, and means for moving said catch into and out of engagement with the cap.

2. A bottle capping and de-capping appliance comprising a bottle gripping means, a presser carried thereby for capping a bottle, a catch on said presser for engaging a cap to remove the same, and means for moving said catch into and out of engagement with the cap, in combination with a magnet in said presser for holding a cap in position therein.

3. A press comprising a pair of gripping tongs, means of opening said tongs in a plane at right angles to the plane of gripping, and a presser operatively connected to said pair of gripping tongs to press a body against an object held by said gripping tong.

ANDREW J. TRUMBO.

Witnesses:
STANLEY F. GRAHAM,
CHAS. L. HUTCHINS.